(12) United States Patent
Oshima et al.

(10) Patent No.: US 11,813,890 B2
(45) Date of Patent: Nov. 14, 2023

(54) MANUFACTURING APPARATUS FOR DRIVE DISK

(71) Applicant: HONDA MOTOR CO., LTD., Tokyo (JP)

(72) Inventors: Ritsuya Oshima, Saitama (JP); Wataru Yada, Saitama (JP); Hiroshi Gomi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 251 days.

(21) Appl. No.: 17/389,632

(22) Filed: Jul. 30, 2021

(65) Prior Publication Data

US 2022/0032683 A1 Feb. 3, 2022

(30) Foreign Application Priority Data

Aug. 3, 2020 (JP) .................. 2020-131433

(51) Int. Cl.
| | |
|---|---|
| *B21K 1/28* | (2006.01) |
| *B60B 19/12* | (2006.01) |
| *B60B 19/00* | (2006.01) |
| *B62K 1/00* | (2006.01) |

(52) U.S. Cl.
CPC .......... *B60B 19/125* (2013.01); *B60B 19/003* (2013.01); *B62K 1/00* (2013.01); *B21K 1/28* (2013.01); *B60B 2310/226* (2013.01); *B60B 2310/228* (2013.01); *B60B 2360/10* (2013.01)

(58) Field of Classification Search
CPC ...... B21K 1/28; B21K 1/32; B21J 5/02; B21J 9/02; B21J 9/04; B21D 53/26; B21D 53/268; B21D 28/24; B21D 28/26; B21D 28/30

See application file for complete search history.

(56) References Cited

U.S. PATENT DOCUMENTS

| | | | | |
|---|---|---|---|---|
| 1,560,135 | A | * 11/1925 | Bell | ............................ B21J 5/00 76/108.1 |
| 2,116,804 | A | * 5/1938 | Swanson | .................... B21J 5/00 72/352 |
| 5,592,847 | A | * 1/1997 | Sarkisian | ................. B21J 13/02 72/356 |
| 2010/0096905 | A1 | 4/2010 | Takenaka et al. | |

FOREIGN PATENT DOCUMENTS

| | | |
|---|---|---|
| JP | 2011063214 A | 3/2011 |
| WO | 2008132779 A1 | 11/2008 |

* cited by examiner

*Primary Examiner* — Teresa M Ekiert (74) *Attorney, Agent, or Firm* — Armstrong Teasdale LLP (57) ABSTRACT

A manufacturing apparatus for a drive disk includes: an upper member and a lower member each including a base and protrusions. Each protrusion is defined by a plurality of surfaces including a first side surface inclined with respect to opposed surfaces of the drive disk and a second side surface parallel to the opposed surfaces. The first side surface of the protrusion of the upper member and the first side surface of the protrusion of the lower member are parallel to each other and face away from each other. The second side surface of the protrusion of the upper member and the second side surface of the protrusion of the lower member face away from each other. The first side surface of the protrusion of the upper member and the first side surface of the protrusion of the lower member come into contact with each other to form the slot.

6 Claims, 10 Drawing Sheets

MANUFACTURING APPARATUS FOR DRIVE DISK

TECHNICAL FIELD

The present invention relates to a manufacturing apparatus for a drive disk used in a frictional drive unit.

BACKGROUND ART

There is a known frictional drive unit used as a drive device for an inverted pendulum vehicle (for example, JP2011-63214A). The frictional drive unit disclosed in JP2011-63214A includes a frame, a pair of drive disks rotatably supported by the frame, an annular main wheel arranged between the pair of drive disks, and a pair of actuators configured to independently drive each drive disk. Each drive disk has a disk shape centered on a rotational axis thereof, and includes a base rotatably supported by the frame and a plurality of drive rollers rotatably supported by an outer circumferential portion of the base.

The base includes a plurality of slots arranged rotationally symmetric around a central axis of the base, bearing holes formed in side wall portions defining each slot, and a roller shaft inserted into the bearing holes in an axial direction and rotatably supporting the corresponding one of the drive rollers. Each drive roller is placed in the corresponding slot so as to be rotatably supported by the bearing holes of the base and be in contact with the main wheel.

Each bearing hole is formed such that the rotational axis of the corresponding one of the drive rollers is skewed with respect to the central axis of the base. As disclosed in WO2008/132779A1, such an arrangement causes a frictional force generated between the outer circumferential surface of each drive roller and the outer surface of the main wheel to act on the main wheel not only in a direction along the main shaft but also in a direction around the main shaft. This allows the frictional drive unit to move the vehicle forward, backward, leftward, or rightward by controlling the rotational direction and rotational speed of each drive disk and thus controlling the rotation of the main wheel in the direction along the main shaft and in the direction around the main shaft.

In each drive disk according to JP2011-63214A, since the rotational axis of each drive roller is inclined with respect to the central axis of the base, each slot penetrates through the base with an inclination from the rotational axis of the base in a side view. It is therefore necessary for each of such slots to be formed by cutting work, which makes it difficult to increase the productivity of the drive disks.

SUMMARY OF THE INVENTION

In view of such a problem of the prior art, a primary object of the present invention is to provide a manufacturing apparatus for a drive disk that can manufacture the drive disk in a simple manner.

To achieve such an object, one embodiment of the present invention provides a manufacturing apparatus for a drive disk, the drive disk (4) including: a plurality of drive rollers (21) each including a supporting shaft (41) protruding from both sides thereof; and a disk body (20) having a plurality of slots (46) arranged in a circumferential direction around a prescribed central axis (X1) and configured to receive the drive rollers, wherein each slot is partially defined by a pair of opposed surfaces (53S, 57S) opposed to each other at a space radially outside the supporting shaft of each drive roller and arranged orthogonally to the supporting shaft, and the opposed surfaces are inclined to the central axis, the manufacturing apparatus comprising: an upper member (70) and a lower member (71) configured to form a whole of the disk body; and a drive unit (60) configured to drive the upper member and the lower member in a moving direction along the central axis, wherein the upper member and the lower member each include a base (72, 75) and protrusions (73, 76) protruding from the base along the moving direction, each protrusion is defined by a plurality of surfaces including a first side surface (73A, 76B) inclined with respect to the opposed surfaces and a second side surface (73B, 76A) parallel to the opposed surfaces, the first side surface of the protrusion of the upper member and the first side surface of the protrusion of the lower member are parallel to each other and face away from each other, the second side surface of the protrusion of the upper member and the second side surface of the protrusion of the lower member face away from each other, the first side surface of the protrusion of the upper member and the first side surface of the protrusion of the lower member come into contact with each other to form the slot.

According to this aspect, since each slot can be formed by using the upper member and the lower member, the drive disk can be manufactured in a simple manner.

In the above aspect, preferably, an angle between the first side surface of the upper member and the second side surface thereof and an angle between the first side surface of the lower member and the second side surface thereof are acute angles.

According to this aspect, the upper member and the lower member can be easily separated from the drive disk after shaping it.

In the above aspect, preferably, the first side surface is parallel to the moving direction.

According to this aspect, the upper member and the lower member can be easily positioned.

In the above aspect, preferably, the upper member includes a U-shaped protrusion (74) passing through a center in an extending direction of the protrusion, extending in a direction orthogonal to the extending direction of the protrusion, and having an end surface (74A) formed into a shape corresponding to the supporting shaft.

According to this aspect, the bearing part for supporting the supporting shaft can be formed by the U-shaped protrusion. Further, since the upper member is provided with the protrusion and the U-shaped protrusion, the positional accuracy of the bearing part with respect to the slot can be increased as compared with a case where the slot and the bearing part are individually formed.

In the above aspect, preferably, the protrusion of the lower member is provided with a U-shaped recess extending from a center thereof in the direction orthogonal to the extending direction of the protrusion and formed into a shape corresponding to the U-shaped protrusion.

According to this aspect, by fitting the U-shaped protrusion with the U-shaped recess, the upper member and the lower member can be positioned, so that the machining accuracy of the drive disk can be further increased.

In the above aspect, preferably, an end of the protrusion of the upper member and an end of the protrusion of the lower member are each provided with a step portion (79, 81), and the step portion of the protrusion of the upper member and the step portion of the protrusion of the lower member engage with each other in a cross-sectional view.

According to this aspect, the upper member and the lower member can be positioned more accurately.

In the above aspect, preferably, an end surface of one of the protrusion of the upper member and the protrusion of the lower member is provided with a positioning projection (86) protruding in the moving direction as viewed in the direction orthogonal to the extending direction of the protrusion, and the step portion of another of the protrusion of the upper member and the protrusion of the lower member is provided with a positioning recess (88) recessed in the moving direction as viewed in the direction orthogonal to the extending direction of the protrusion and configured to receive the positioning projection.

According to this aspect, the upper member and the lower member can be positioned more accurately.

Thus, according to the above aspects, it is possible to provide a manufacturing apparatus for a drive disk that can manufacture the drive disk in a simple manner.

DESCRIPTION OF THE PREFERRED EMBODIMENT(S)

In the following, an embodiment of drive disks according to the present invention will be described with reference to the drawings. The drive disks are used for a frictional drive unit. The frictional drive unit is used for an inverted pendulum vehicle, for example.

Figure 1:
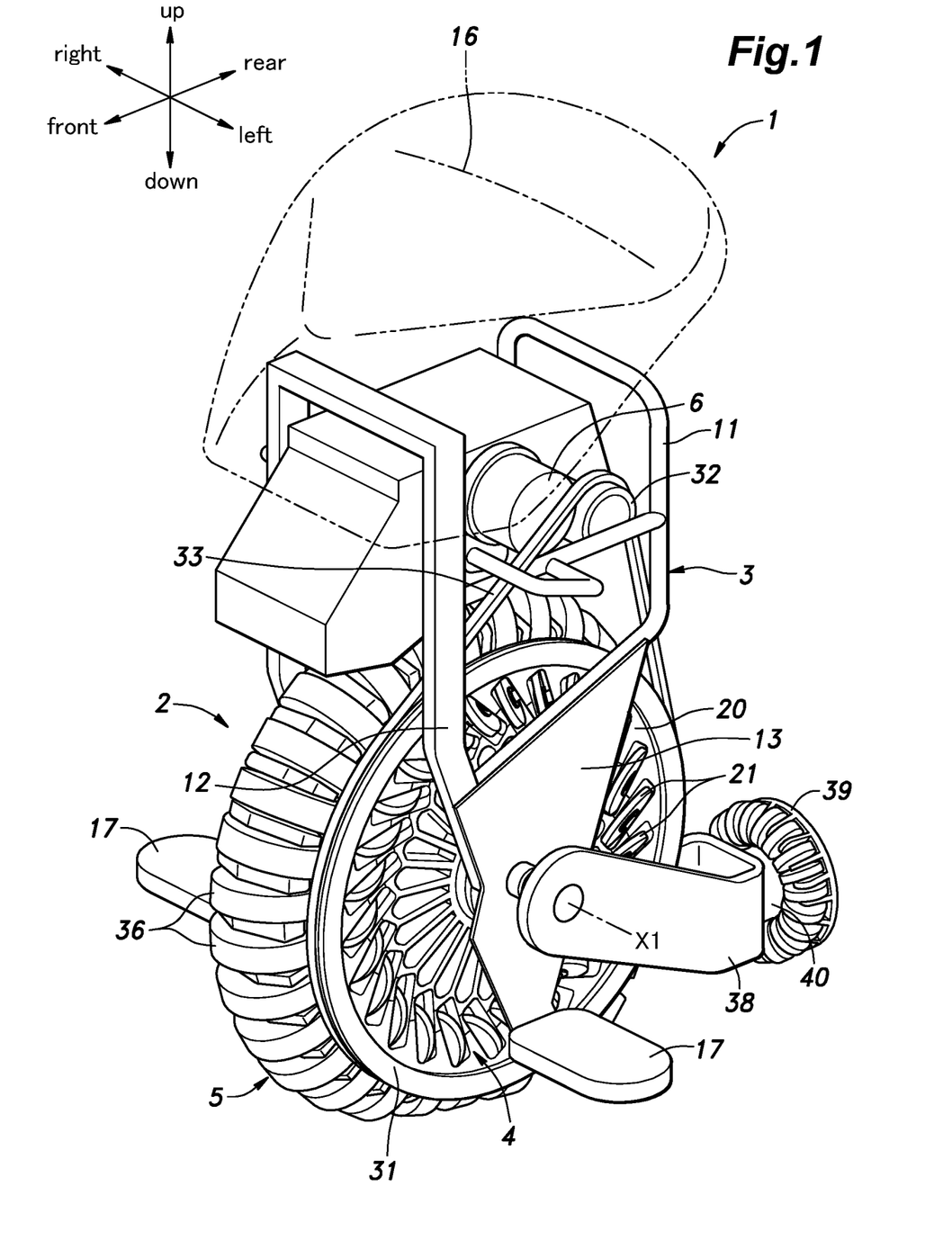
FIG. 1 is a perspective view of an inverted pendulum vehicle including drive disks according to an embodiment.
Figure 2:
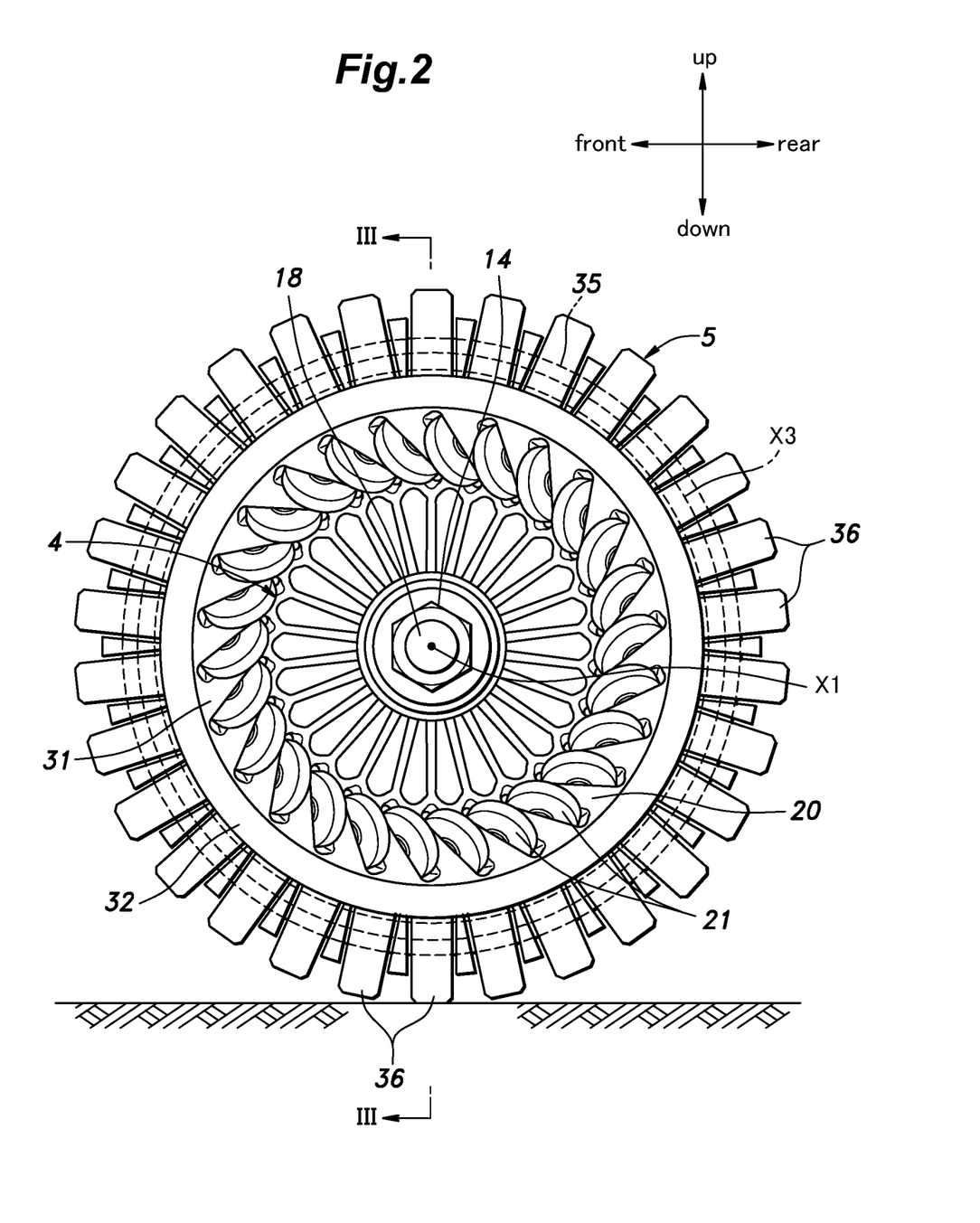
FIG. 2 is a side view of a frictional drive unit.
Figure 3:
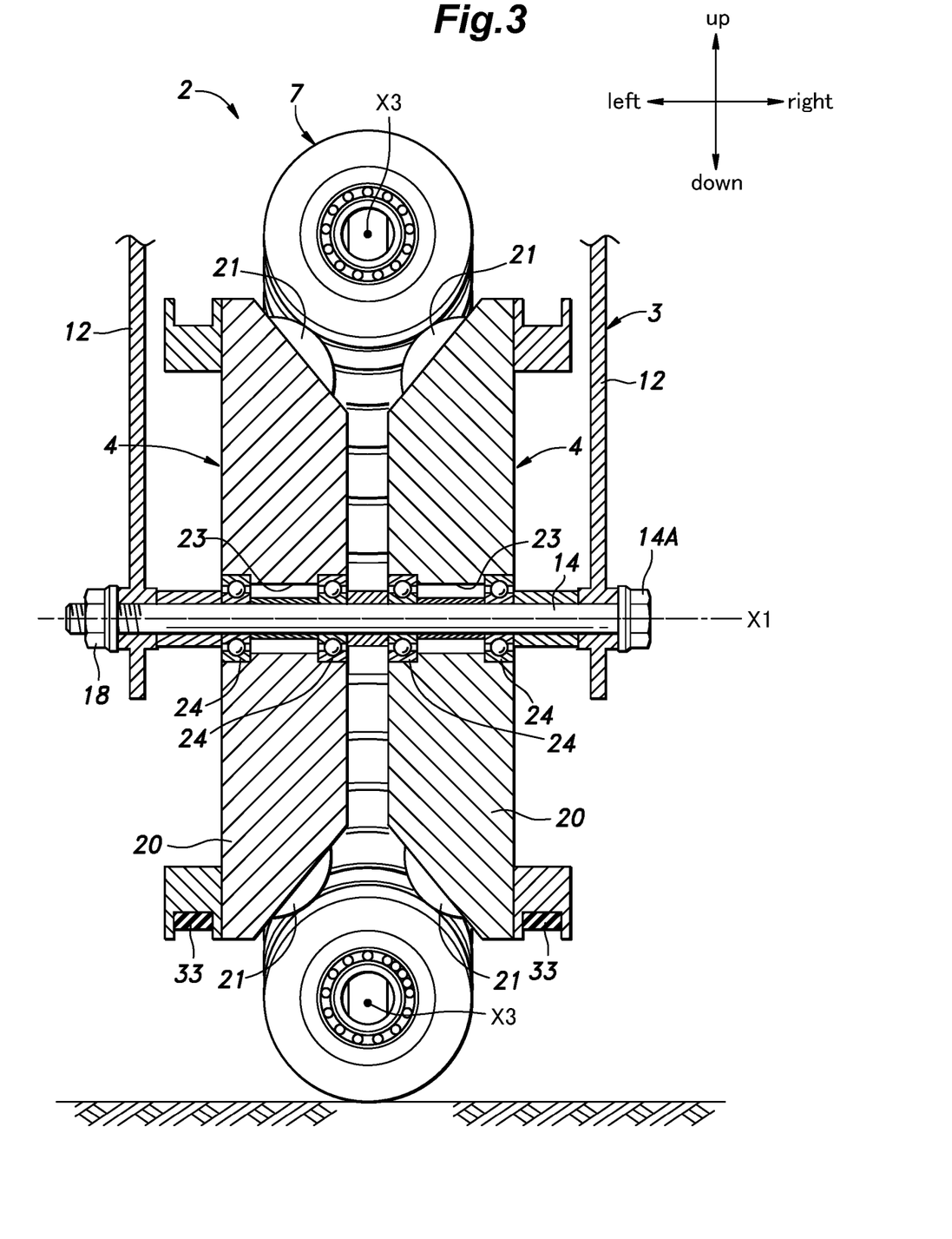
FIG. 3 is a sectional view taken along a line III-III of FIG. 2.

As shown in FIGS. 1 to 3, an inverted pendulum vehicle 1 includes a frictional drive unit 2. The frictional drive unit 2 includes a frame 3, a pair of drive disks 4 (left and right drive disks 4) rotatably supported by the frame 3, an annular main wheel 5 arranged between the pair of drive disks 4, and a pair of actuators 6 configured to independently rotate the pair of drive disks 4.

As shown in FIG. 1, the frame 3 includes an upper frame 11 formed in a substantial parallelepiped, left and right lower frames 12 extending downward from left and right lower ends of the upper frame 11, left and right lower plates 13 respectively connected to the left and right lower frames 12, and a frame shaft 14 (see FIGS. 2 and 3) extending between the left and right lower frames 12. A saddle 16 to support the buttocks of the occupant is attached to an upper part of the upper frame 11. Left and right footrests 17 to support the soles of the occupant are attached to lower ends of the lower plates 13.

As shown in FIGS. 2 and 3, the frame shaft 14 extends in the lateral direction, and is connected to the left and right lower frames 12. A left end of the frame shaft 14 passes through the left lower frame 12, and a right end of the frame shaft 14 passes through the right lower frame 12. The frame shaft 14 is provided with a bolt head 14A at a base end thereof, and comes into contact with one lower frame 12 at the bolt head 14A. A nut 18 is attached to a tip end of the frame shaft 14 so as to fix the frame shaft 14 to the other lower frame 12.

The drive disks 4 are each arranged on either side of the annular main wheel 5, and configured to rotate the main wheel 5 around a central axis and an annular axis by applying a frictional force to the main wheel 5. Each of the drive disks 4 includes a disk-shaped base 20 (disk body) rotatably supported by the frame 3 and a plurality of drive rollers 21 (the rollers) rotatably supported on a surface (hereinafter, referred to as an inner surface) of the base 20. The inner surface of the base 20 of one drive disk 4 is opposed to the inner surface of the base 20 of the other drive disk 4.

In the present embodiment, the left and right drive disks 4 are rotatably supported by the frame shaft 14, and are arranged between the left and right lower frames 12. Each of the left and right drive disks 4 is formed in a disk shape, and has a bearing hole 23 (through hole) in the center thereof. The frame shaft 14 passes through the bearing hole 23 of each of the left and right drive disks 4. The left and right drive disks 4 are supported by the frame shaft 14 so as to rotate around an axis X1 (central axis). Bearings 24 such as ball bearings are attached to the bearing hole 23, and each of the left and right drive disks 4 is supported by the frame shaft 14 via the bearings 24 so as to rotate around the prescribed axis X1.

A driven pulley 31 is provided on the opposite surface of each of the left and right drive disks 4. The driven pulley 31 is provided coaxially with each of the left and right drive disks 4. The upper frame 11 is provided with a right actuator 6 to drive the right drive disk 4 and a left actuator 6 to drive the left drive disk 4. Each actuator 6 consists of, for example, an electric motor. A drive pulley 32 is provided on an output shaft of each actuator 6. The drive pulley 32 and the driven pulley 31, which correspond to each other in the lateral direction, are connected by a belt 33. The left and right actuators 6 can rotate independently of each other, thereby rotating the left and right drive disks 4 independently.

As shown in FIGS. 1 to 3, the main wheel 5 has an annular shape, and is arranged between the pair of drive disks 4 so as to be coaxial with the drive disks 4, and the main wheel 5 can rotate around the central axis. In the present embodiment, the main wheel 5 includes an annular core member 35 and a plurality of driven rollers 36 rotatably supported by the core member 35. The plurality of driven rollers 36 are arranged at equal intervals in the circumferential direction of the core member 35. Each driven roller 36 is rotatably supported by the annular core member 35 around an axis X3 (annular axis) of the core member 35, thereby making the main wheel 5 rotatable around the annular axis. More specifically, each driven roller 36 can rotate around the tangent of the core member 35 at the respective position with respect to the core member 35. Upon receiving an external force, each driven roller 36 rotates with respect to the core member 35.

The main wheel 5 is arranged along the outer circumferential parts of the left and right drive disks 4, and comes into contact with the plurality of drive rollers 21 of the left and right drive disks 4. The drive rollers 21 of the left and right drive disks 4 come into contact with an inner circumferential part of the main wheel 5, and hold the main wheel 5 from either lateral side thereof. Further, the drive rollers 21 of the left and right drive disks 4 come into contact with the inner circumferential part of the main wheel 5, thereby suppressing the displacement of the drive disks 4 in the radial direction around the axis X1. Accordingly, the main wheel 5 is supported by the left and right drive disks 4, and the central axis of the main wheel 5 (the core member 35) is arranged coaxially with the axis X1 of the left and right drive disks 4. The plurality of driven rollers 36 of the main wheel 5 come into contact with the plurality of drive rollers 21 of the left and right drive disks 4.

The base 20 has a disk shape with the axis X1 as a central axis. A plurality of supporting parts 37 rotatably supporting the drive rollers 21 are provided on the inner surface (the surface adjacent to the main wheel 5) of the base 20. Each of the left and right drive rollers 21 is supported by the corresponding one of the supporting parts 37 such that the rotational axis X2 of each of the left and right drive rollers 21 is three-dimensionally inclined with respect to a virtual vertical plane orthogonal to the central axis (that is, the axis X1) of the base 20. The axis X2 of each drive roller 21 is skewed with respect to the central axis X1 of the base 20 and is inclined with respect to the circumferential direction of each driven roller 36. This causes a frictional force generated between the outer circumferential surface of each drive roller 21 and the outer surface of the main wheel 5 to act in the tangential direction of the main wheel 5 and the circumferential direction around the central axis of the main wheel 5 (that is, a direction in which each driven roller 36 is rotated with respect to the core member 35).

As shown in FIG. 1, left and right front ends of a tail wheel arm 38 are supported by the left and right lower plates 13 such that the tail wheel arm 38 can rotate around a rotational axis extending in the lateral direction. The rotational axis of the tail wheel arm 38 may coincide with the axis X1 of the drive disks 4. The tail wheel arm 38 extends rearward from the front end thereof, which is bifurcated. A tail wheel 39 is provided at a rear end of the tail wheel arm 38. The tail wheel 39 is, for example, an omni-wheel, and is supported by a rear end of the tail wheel arm 38 so as to rotate around an axis extending in the front-and-rear direction. The tail wheel 39 is rotated by a tail wheel motor 40, which is an electric motor provided at the rear end of the tail wheel arm 38.

When the left and right drive disks 4 rotate in the same direction at the same rotational speed, only a force in the circumferential (tangential) direction acts on the driven rollers 36 from the drive rollers 21. This causes the main wheel 5 to rotate together with the left and right drive disks 4. Namely, the main wheel 5 rotates around its own rotational axis, which coincides with the axis X1, and the inverted pendulum vehicle 1 moves forward or backward. At this time, the drive rollers 21 of the drive disks 4 and the driven rollers 36 of the main wheel 5 do not rotate with respect to the core member 35.

Since the axis X2 of each drive roller 21 is inclined with respect to the circumferential direction of each driven roller 36, the rotation of the left and right drive disks 4 at different rotational speeds causes not only a force in the circumferential direction but also a force in a direction orthogonal to the above force to act on the driven rollers 36 from the drive rollers 21. In addition to the rotation of the main wheel 5 around its own rotational axis, the force in the orthogonal direction causes the driven rollers 36 to rotate around the core member 35. The rotation of the driven rollers 36 around the core member 35 applies a driving force to the inverted pendulum vehicle 1 not only in the front-and-rear direction but also in the lateral direction, thereby causing the inverted pendulum vehicle 1 to move diagonally forward or backward.

In the following, a structure on the inner surface side of each drive disk 4 will be described in detail with reference to FIGS. 4 to 6B.

Figure 4:
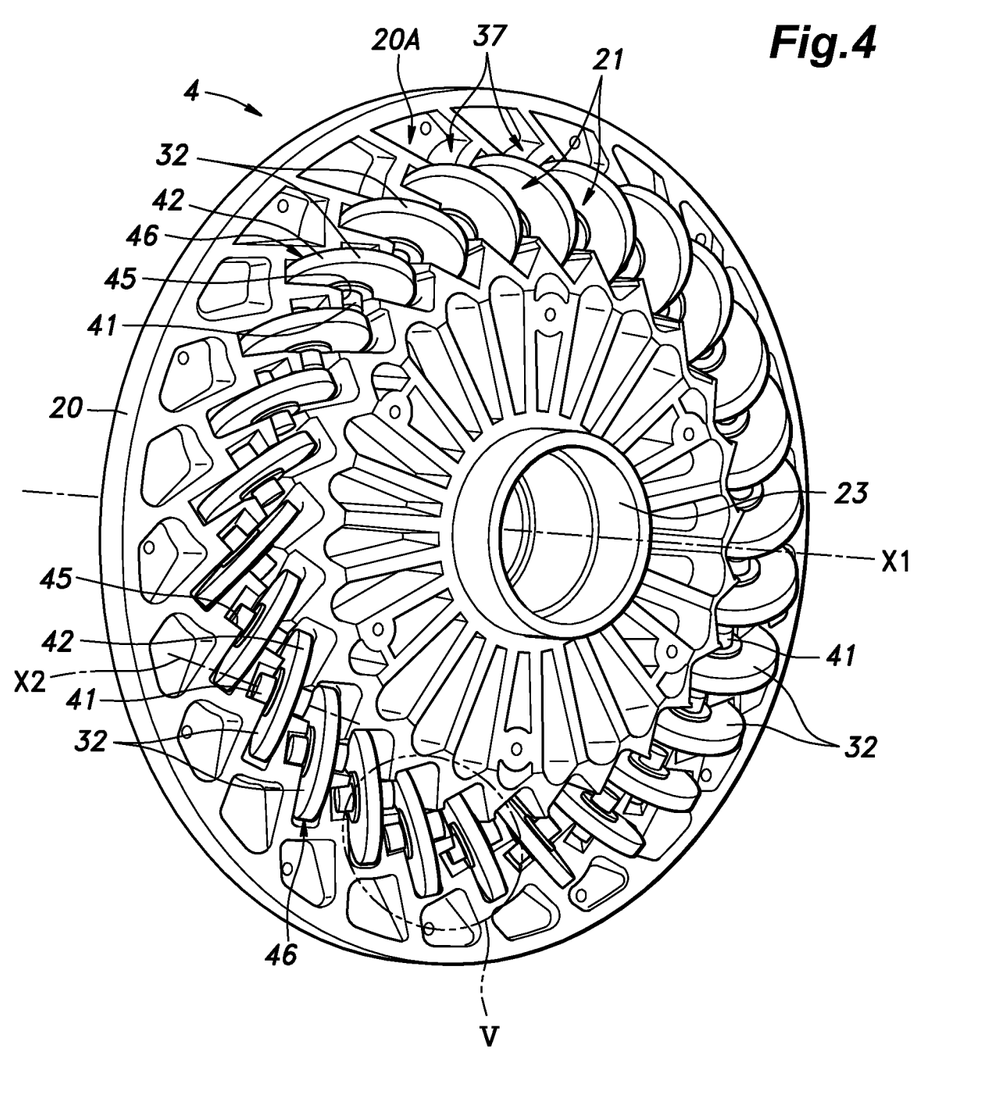
FIG. 4 is a perspective view of one of the drive disks.

As shown in FIG. 4, the base 20 of each drive disk 4 is provided with an inclined portion 20A in an outer circumferential portion of the inner surface thereof. The inclined portion 20A of the base 20 of one drive disk 4 is inclined so as to be separated from the inclined portion 20A of the base 20 of the other drive disk 4 as extending radially outward. The inclined portion 20A causes the drive disk 4 to taper down toward the radial outside. The inclined portion 20A gives the drive disk 4 a truncated cone shape.

The supporting parts 37 are formed in the outer circumferential portion of the inner surface of the base 20, that is, the inclined portion 20A of the base 20. The supporting parts 37 are arranged to be rotationally symmetric around the central axis X1 of the base 20.

Figure 5A:
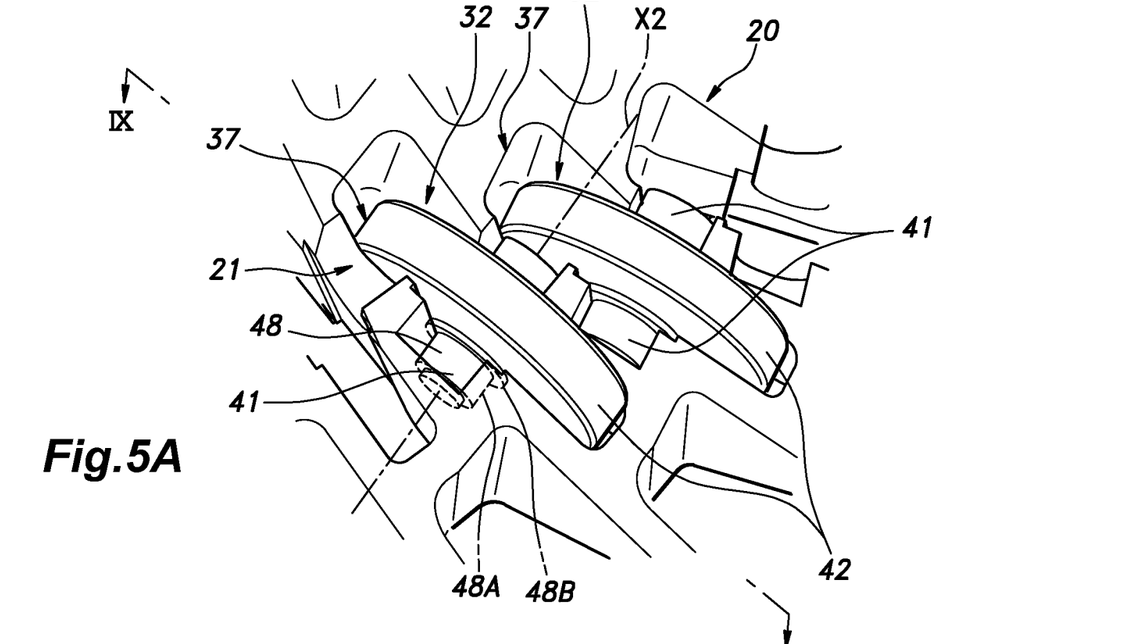
FIG. 5A is an enlarged view of a circular portion V of FIG. 4.

As shown in FIG. 5A, each drive roller 21 includes a columnar roller shaft 41 (supporting shaft) and a cylindrical roller body 42 provided at a center in a longitudinal direction of the roller shaft 41 so as to be coaxial with the roller shaft 41. The roller shaft 41 extends through the roller body 42 and has both ends protruding from the both sides of the roller body 42. Bushings 48 made of resin are provided at both ends of the roller shaft 41. Each bushing 48 includes a cylindrical portion 48A serving as an outer circumferential surface of the roller shaft 41, and a disk-shaped flange portion 48B extending radially outward from an end of the cylindrical portion 48A adjacent to the roller body 42.

Figure 5B:
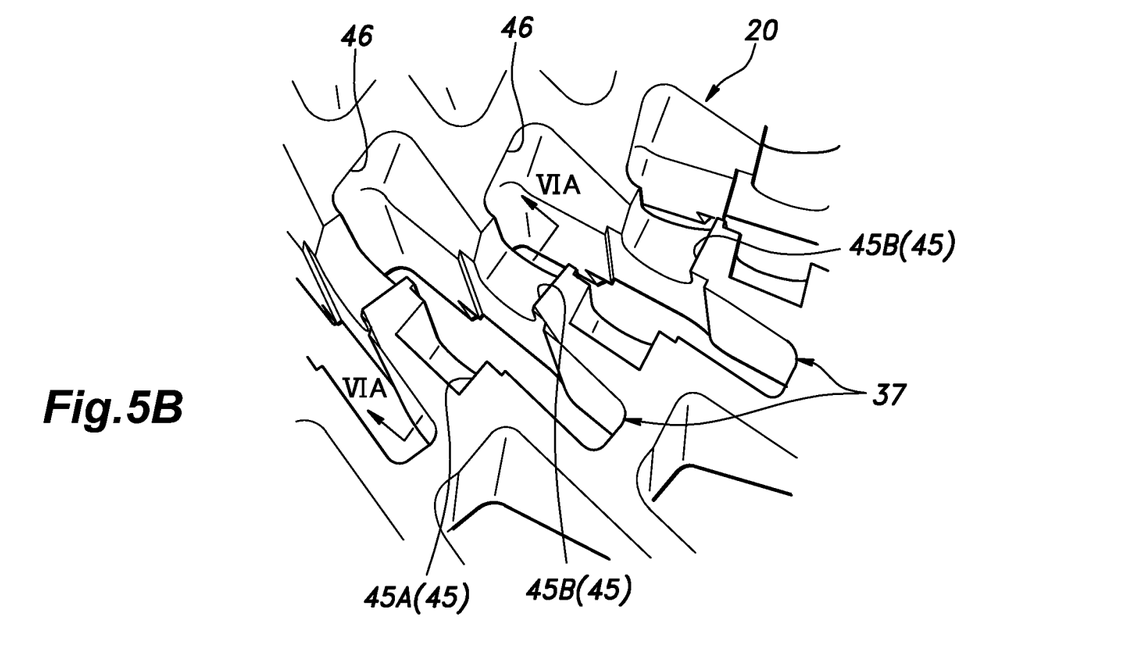
FIG. 5B is an enlarged view of a base corresponding to FIG. 5A.

As shown in FIG. 5B, each supporting part 37 includes a pair of bearing grooves 45 (bearing parts) that receive both ends of the roller shaft 41 of each drive roller 21, and a slot 46 that is provided between the pair of bearing grooves 45 and receives a part of the roller body 42. The pair of bearing grooves 45 are recesses provided in a surface of the inclined portion 20A (that is, the inner surface of the base 20), and the slot 46 is a hole penetrating through the inclined portion 20A. The slot 46 communicates with the pair of bearing grooves 45. The supporting parts 37 are concentrically arranged at equal intervals in the inclined portion 20A.

The pair of bearing grooves 45 are formed to allow the ends of the roller shaft 41 to fit thereinto from the surface side of the inclined portion 20A. Further, it is preferable that the bearing grooves 45 be formed such that the roller shaft 41 can fit thereinto without excessive play. A bottom portion of each bearing groove 45 can receive the cylindrical portion 48A of the bushing 48, and is formed in a half-cylindrical surface corresponding to the outer circumferential surface of the bushing 48.

As shown in FIG. 4, the slots 46 penetrate through the base 20 with an inclination from the axis X1 passing through the center of the base 20 and are arranged in the circumferential direction around the axis of the base 20. Each drive roller 21 is supported by the base 20 so as to be rotatable around the axis of the roller shaft 41 in a state where the roller shaft 41 is received by the bearing grooves 45 and the roller body 42 is received by the slot 46. At this time, the rotational axis of the roller shaft 41 (the direction of the axis X2) is skewed with respect to the rotational axis of the base 20 (the direction of the axis X1).

Figure 6A:
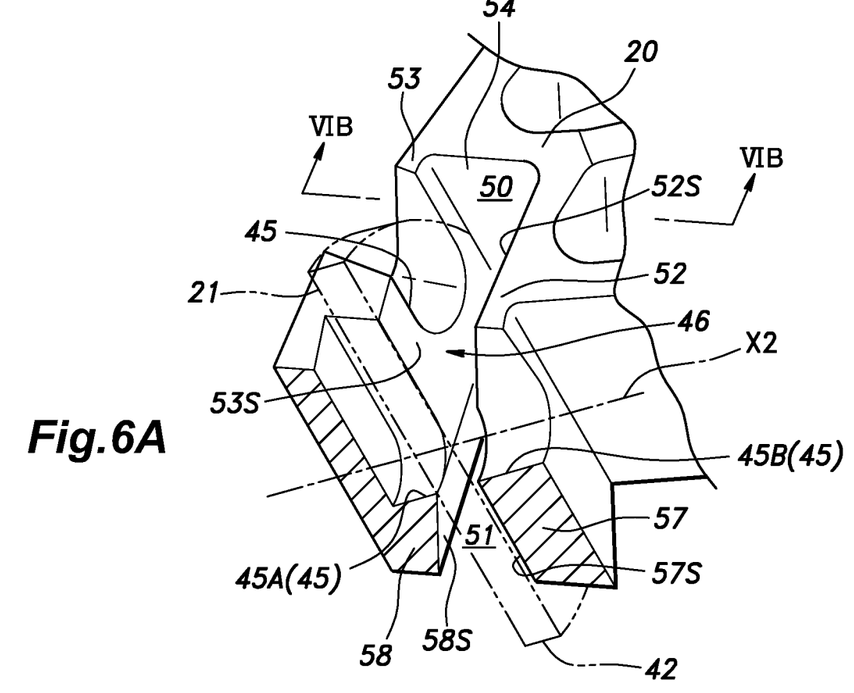
FIG. 6A is a sectional view taken along a line VIA-VIA of FIG. 5B.
Figure 6B:
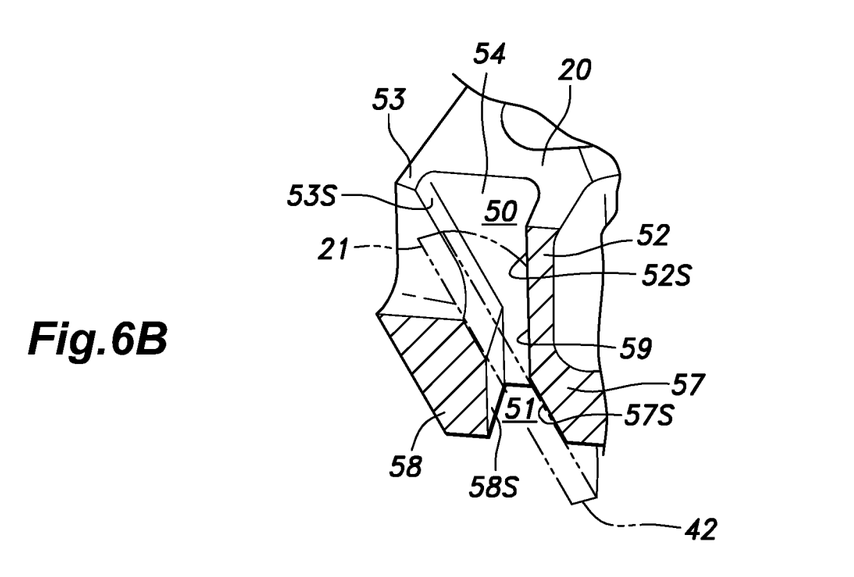
FIG. 6B is a sectional view taken along a line VIB-VIB of FIG. 6A.

As shown in FIGS. 6A and 6B, each slot 46 has an inner space 50 provided adjacent to an inner surface of the slot 46 and an outer space 51 provided adjacent to an outer surface of the slot 46. In the present embodiment, adjacent slots 46 communicate with each other via a bearing groove 45B (one of the pair of bearing grooves 45) located on a counterclockwise side as viewed from the inner circumferential side of the base 20.

The inner space 50 is defined by a first inner wall 52 and a second inner wall 53 opposed to each other approximately in the circumferential direction around the central axis X1 of the base 20, and a third inner wall 54 and a fourth inner wall (not shown) opposed to each other approximately in the radial direction around the central axis X1 of the base 20. The first inner wall 52 has an inner parallel surface 52S approximately parallel to the central axis X1 of the base 20. The second inner wall 53 has an inner opposed surface 53S inclined with respect to the central axis X1 of the base 20 and approximately orthogonal to the axis X2 of the roller shaft 41. One bearing groove 45A is formed in the inner opposed surface 53S, and the second inner wall 53 serves as a bearing wall of one end of the roller shaft 41. The inner opposed surface 53S is inclined to cause a distance between the inner parallel surface 52S and the inner opposed surface 53S to decrease from the inner circumferential side of the base 20 toward the outer circumferential side thereof. When each drive roller 21 is supported by the base 20, the inner opposed surface 53S is in close proximity to a space located around the roller shaft 41 (more specifically, a space located radially outside the roller shaft 41) of the drive roller 21, and is opposed to the roller body 42 of the drive roller 21. The inner parallel surface 52S is located on the counterclockwise side of the inner opposed surface 53S as viewed from the inner circumferential side. The third inner wall 54 and the fourth inner wall are approximately parallel to the axis of the base 20 and define surfaces opposed to each other with the axis X2 of the roller shaft 41 interposed therebetween.

The outer space 51 is defined by a first outer wall 57 and a second outer wall 58 opposed to each other approximately in the circumferential direction around the central axis X1 of the base 20, and a third outer wall 59 and a fourth outer wall (not shown) opposed to each other approximately in the radial direction around the central axis X1 of the base 20. The first outer wall 57 has an outer opposed surface 57S inclined with respect to the axis X1 of the base 20 and approximately orthogonal to the axis X2 of the roller shaft 41. The other bearing groove 45B is formed in the outer opposed surface 57S, and the first outer wall 57 serves as a bearing wall of the other end of roller shaft 41. The second outer wall 58 has an outer parallel surface 58S approximately parallel to the axis X1 of the base 20. The outer opposed surface 57S is inclined to cause a distance between the outer opposed surface 57S and the outer parallel surface 58S to increase from the inner circumferential side of the base 20 toward the outer circumferential side thereof. When each drive roller 21 is supported by the base 20, the outer opposed surface 57S is in close proximity to a space located around the roller shaft 41 (more specifically, a space located radially outside the roller shaft 41) of the drive roller 21, and is opposed to the roller body 42 of the drive roller 21. The outer opposed surface 57S is located on the counterclockwise side of the outer parallel surface 58S as viewed from the inner circumferential side. The third outer wall 59 and the fourth outer wall each define a plane orthogonal to the axis X2 of the roller shaft 41 and approximately parallel to the axis of the base 20.

As described above, each slot 46 is defined by the first inner wall 52, the second inner wall 53 having the bearing groove 45A and the inner opposed surface 53S, the third inner wall 54, the fourth inner wall, the first outer wall 57 having the bearing groove 45B and the outer opposed surface 57S, the second outer wall 58, the third outer wall 59, and the fourth outer wall. The inner opposed surface 53S and the outer opposed surface 57S are arranged orthogonally to the axis X2 (the roller shaft 41) and opposed to each other, and the slot 46 is partially defined by the inner opposed surface 53S and the outer opposed surface 57S.

Next, a manufacturing apparatus for manufacturing the drive disk 4 (especially, the base 20) will be described with reference to FIGS. 7A and 7B. The manufacturing apparatus includes a pair of die members configured to form a whole of the base 20, and a die drive unit 60 configured to drive each of the die members in a prescribed die-cutting direction (an example of a moving direction). Each die member is rotationally symmetric around one axis. Each die member is arranged centered on one central axis. At least one of the die members is moved along the central axis to cause the die members to be combined, thereby die-cutting a metal disk serving as a base material to manufacture the base 20. The moving direction of the die member at this time, that is, the direction along the central axis thereof corresponds to the die-cutting direction. In the present embodiment, the manufacturing apparatus manufactures the base 20 by so-called forging in which the metal disk (not shown) serving as the base material is pressed and shaped. The present invention, however, is not limited to this aspect, and the manufacturing apparatus may be configured to manufacture the base 20 by so-called casting in which metal is melted and poured into a space between a pair of mold members, or alternatively may be configured to manufacture the base 20 by so-called injection molding in which a material is molded by being injected into a space between a pair of mold members. Hereinafter, one die member to form the inner surface side of the base 20 is referred to as an upper die 70 (an example of an upper member), and the other die member to form the outer surface side thereof is referred to as a lower die 71 (an example of a lower member). The die-cutting direction is set coincident with an up-and-down direction (vertical direction), and the upper die 70 is disposed above the lower die 71.

Hereinafter, descriptions of the upper die 70 and the lower die 71 will be given with attention paid to their respective parts for forming the supporting parts 37. Further, since the plurality of supporting parts 37 are provided side by side in the circumferential direction, a structure for forming one of the supporting parts 37 will be described. Further, FIG. 7A shows four parts of the upper die 70 for forming the supporting parts 37 in an enlarged manner, and FIG. 7B shows corresponding parts of the lower die 71 in an enlarged manner.

Figure 7A:
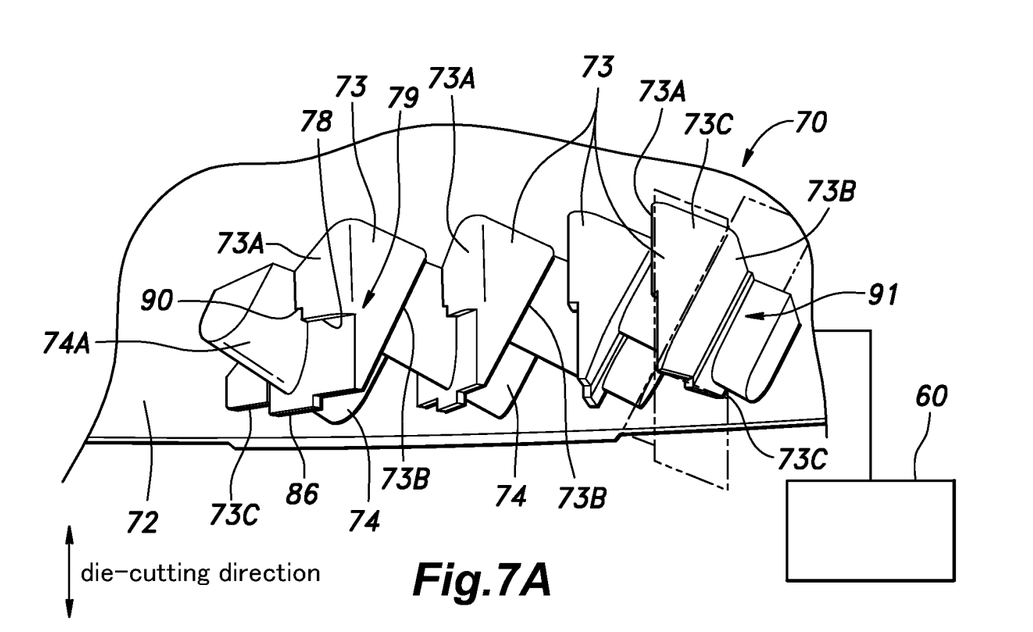
FIG. 7A is a perspective view of an upper die for forming the base.
Figure 8:
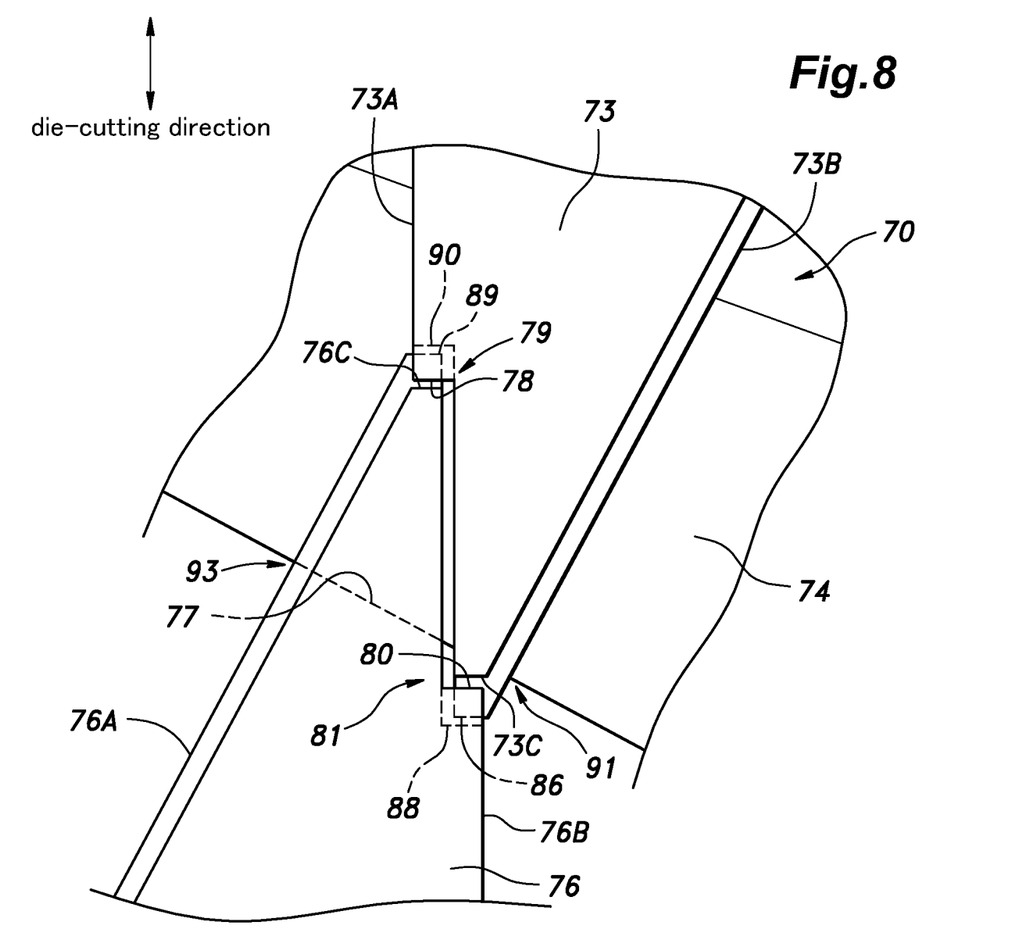
FIG. 8 is an explanatory view for explaining a state when the upper die and the lower die are combined.
Figure 9:
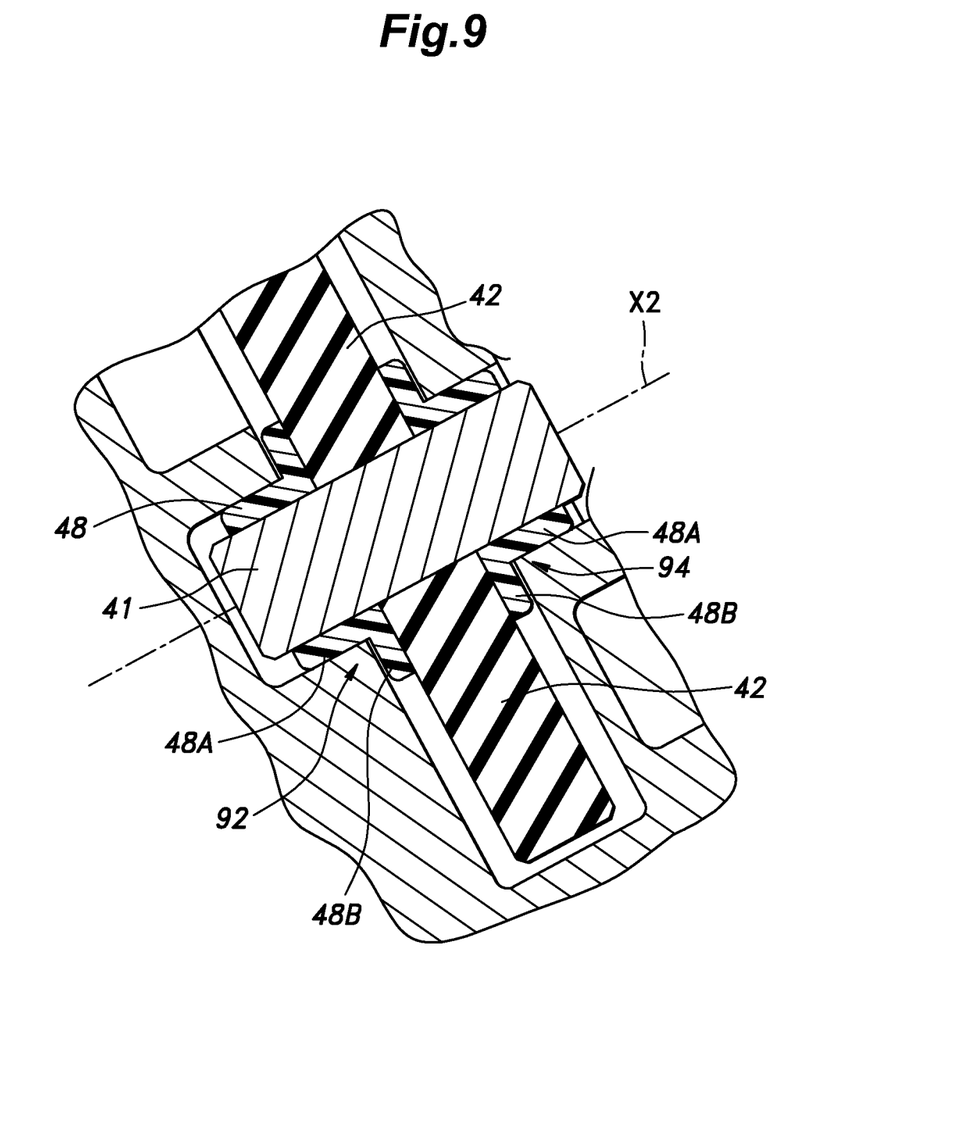
FIG. 9 is a sectional view taken along a line IX-IX of FIG. 5A.

As shown in FIG. 7A, the upper die 70 includes a disk-shaped upper die body 72 (base), upper die protrusions 73 each extending in a stripe shape and protruding from a lower surface of the upper die body 72 along the die-cutting direction (downward), and U-shaped protrusions 74 each extending in a direction orthogonal to the extending direction of the corresponding one of the upper die protrusions 73 and passing through the center thereof. As shown in FIG. 8, Each upper die protrusion 73 has an approximately triangular cross section. The upper die protrusion 73 is defined by an upper die first wall surface 73A and an upper die second wall surface 73B extending in the extending direction thereof, and two surfaces 73C approximately orthogonal to the extending direction thereof. The upper die second wall surface 73B is inclined with respect to the upper die first wall surface 73A and forms a plane crossing the upper die first wall surface 73A (see a two-dot chain line in FIG. 7A). In the present embodiment, the upper die first wall surface 73A is parallel to the die-cutting direction (that is, perpendicular to the lower surface of the upper die body 72). As shown in FIG. 8, an angle between the upper die first wall surface 73A and the upper die second wall surface 73B is an acute angle. Incidentally, an angle between two surfaces means an angle between normal vectors of the two surfaces, and when this angle is less than 45 degrees, it will be described that the angle between the two surfaces is an acute angle. As shown in FIG. 7A, each U-shaped protrusion 74 also extends in a stripe shape and protrudes from the lower surface of the upper die body 72. The U-shaped protrusion 74 is formed into a U-shape in a cross-sectional view, and has an end surface 74A formed into a semicircular shape in a cross-sectional view to correspond to the roller shaft 41. The upper die protrusion 73 and the U-shaped protrusion 74 are orthogonal to each other on the lower surface of the upper die body 72, and the U-shaped protrusion 74 passes through approximately the center of the upper die protrusion 73.

Figure 7B:
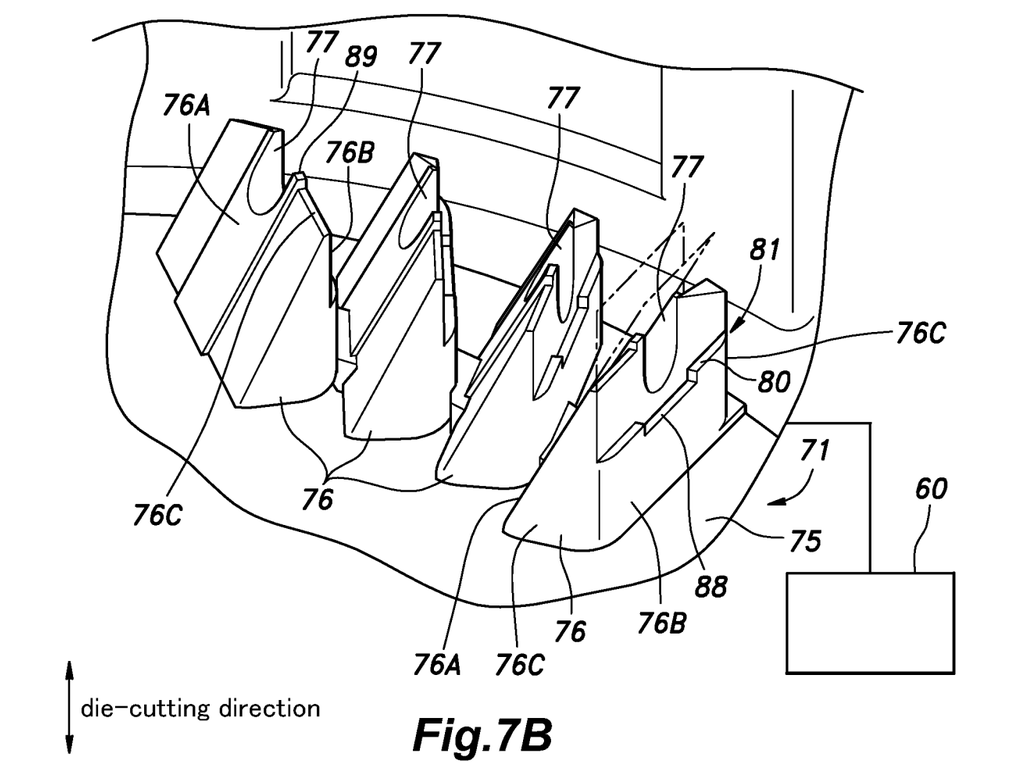
FIG. 7B is a perspective view of a lower die for forming the base.

As shown in FIG. 7B, the lower die 71 includes a disk-shaped lower die body 75 (base) having a horizontal lower surface, and lower die protrusions 76 each extending in a stripe shape and protruding from an upper surface (one surface) of the lower die body 75 along the die-cutting direction (upward). As shown in FIG. 8, each lower die protrusion 76 has an approximately triangular cross section. The lower die protrusion 76 is defined by a lower die first wall surface 76A and a lower die second wall surface 76B extending in the extending direction thereof, and two surfaces 76C approximately orthogonal to the extending direction thereof. The lower die first wall surface 76A is inclined with respect to the lower die second wall surface 76B and forms a plane crossing the lower die second wall surface 76B (see a two-dot chain line in FIG. 7B). In the present embodiment, the lower die second wall surface 76B is parallel to the die-cutting direction (that is, perpendicular to the upper surface of the lower die body 75). An angle between the lower die first wall surface 76A and the lower die second wall surface 76B is an acute angle.

As shown in FIG. 7B, a U-shaped recess 77 recessed toward the lower die body 75 is provided at the end of each lower die protrusion 76. The U-shaped recess 77 is provided at the center in the extending direction of the lower die protrusion 76, and extends in a direction orthogonal to the extending direction of the lower die protrusion 76. The U-shaped recess 77 is formed into a U shape in a cross-sectional view, and has a bottom surface formed into a semicircular shape in a cross-sectional view. The U-shaped recess 77 is formed into a shape corresponding to the U-shaped protrusion 74, thereby allowing the U-shaped protrusion 74 to fit into the U-shaped recess 77.

In order to manufacture the base 20 of the drive disk 4, a worker first places a metal disk approximately horizontally and then places the upper die 70 and the lower die 71 above and below the metal disk, respectively. At this time, the upper die 70 and the lower die 71 are placed such that the lower surface of the upper die 70 faces downward, the upper surface of the lower die 71 faces upward, and the lower surface of the upper die 70 and the upper surface of the lower die 71 are opposed to each other. Further, the upper die 70 and the lower die 71 are placed to make the upper surface of the upper die 70 and the lower surface of the lower die 71 horizontal. Subsequently, the worker moves the upper die 70 and the lower die 71 along the central axis of the metal disk (in the vertical direction in the drawing) and presses the upper die 70 and the lower die 71 against the metal disk until the end of the upper die first wall surface 73A of each upper die protrusion 73 and the end of the lower die second wall surface 76B of the corresponding lower die protrusion 76 come into contact with each other and each U-shaped protrusion 74 fits into the corresponding U-shaped recess 77. Accordingly, the metal disk is die-cut by using the upper die protrusion 73 and the lower die protrusion 76 to form each slot 46 in the metal disk. In other words, the upper die first wall surface 73A of the upper die protrusion 73 and the lower die second wall surface 76B of the lower die protrusion 76 come into contact with each other to form each slot 46. At this time, the upper die first wall surface 73A (first side surface) forms the inner parallel surface 52S of the first inner wall 52, the upper die second wall surface 73B (second side surface) forms the inner opposed surface 53S of the second inner wall 53, the lower die first wall surface 76A (second side surface) forms the outer opposed surface 57S of the first outer wall 57, and the lower die second wall surface 76B (first side surface) forms the outer parallel surface 58S of the second outer wall 58. As shown in FIG. 8, the upper die first wall surface 73A (first side surface) and the lower die second wall surface 76B (first side surface) face away from each other. As apparent from FIGS. 6A, 6B, and 8, the upper die first wall surface 73A and the lower die second wall surface 76B are parallel to each other. The upper die first wall surface 73A forms the inner parallel surface 52S, and the lower die second wall surface 76B forms the outer parallel surface 58S. Further, as shown in FIG. 8, the upper die second wall surface 73B (second side surface) and the lower die first wall surface 76A (second side surface) face away from each other. As apparent from FIGS. 6A, 6B, and 8, the upper die second wall surface 73B forms the inner opposed surface 53S, and the lower die first wall surface 76A forms the outer opposed surface 57S. Further, each U-shaped protrusion 74 forms bottom portions of the bearing grooves 45 recessed downward in the inner opposed surface 53S of the second inner wall 53 and the outer opposed surface 57S of the first outer wall 57.

The inner opposed surface 53S is formed along the upper die second wall surface 73B so as to be parallel to the upper die second wall surface 73B, and is inclined with respect to the upper die first wall surface 73A. The outer opposed surface 57S is formed along the lower die first wall surface 76A so as to be parallel to the lower die first wall surface 76A and is inclined with respect to the lower die second wall surface 76B. At this time, the inner opposed surface 53S and the outer opposed surface 57S are parallel to each other. The inner parallel surface 52S is formed along the upper die first wall surface 73A so as to be parallel to the upper die first wall surface 73A. The outer parallel surface 58S is formed along the lower die second wall surface 76B so as to be parallel to the lower die second wall surface 76B. The inner parallel surface 52S and the outer parallel surface 58S are parallel to each other. In the present embodiment, the inner parallel surface 52S and the outer parallel surface 58S are parallel to the vertical direction.

In the present embodiment, as shown in FIGS. 7A, 7B, and 8, the upper die first wall surface 73A has an upper die step portion 79 provided thereon, and the upper die step portion 79 has a surface (hereinafter, referred to as an upper die contact surface 78) facing in the protruding direction, that is, downward. Likewise, the lower die second wall surface 76B has a lower die step portion 81 provided thereon, and the lower die step portion 81 has a surface (hereinafter, referred to as a lower die contact surface 80) facing in the protruding direction. When the U-shaped protrusion 74 fits into the U-shaped recess 77, the end surface 73C of the upper die protrusion 73 comes into contact with the lower die contact surface 80, the end surface 76C of the lower die protrusion 76 comes into contact with the upper die contact surface 78, and the upper die step portion 79 and the lower die step portion 81 engage with each other in a cross-sectional view, thereby allowing the upper die 70 and the lower die 71 to be positioned more accurately.

As shown in FIGS. 7A and 7B, each upper die protrusion 73 has a positioning projection 86 provided at the end thereof and protruding in the die-cutting direction. The positioning projection 86 has an approximately rectangular plate shape protruding downward as viewed in the direction orthogonal to the extending direction of the upper die protrusion 73. The lower die contact surface 80 of the lower die step portion 81 is provided with a positioning recess 88 provided at a position corresponding to the positioning projection 86, and the positioning recess 88 is recessed downward (that is, in the die-cutting direction) to receive the positioning projection 86. The positioning recess 88 is formed in an approximately rectangular shape to correspond to the positioning projection 86. When the drive disk 4 is shaped, the positioning projection 86 and the positioning recess 88 engage with each other, thereby allowing the upper die 70 and the lower die 71 to be positioned more accurately.

In the present embodiment, each lower die protrusion 76 is further provided with a secondary positioning projection 89 provided at the end thereof and protruding in the die-cutting direction. The secondary positioning projection 89 protrudes upward in the vicinity of the U-shaped recess 77. The upper die contact surface 78 of the upper die step portion 79 has a secondary positioning recess 90 provided at a position corresponding to the secondary positioning projection 89, and the secondary positioning recess 90 is recessed upward (that is, in the die-cutting direction) to receive the secondary positioning projection 89. This causes the secondary positioning projection 89 and the secondary positioning recess 90 to engage with each other when the drive disk 4 is shaped, thereby allowing the upper die 70 and the lower die 71 to be positioned more accurately.

Next, effects of the manufacturing apparatus for the drive disk 4 configured as described above will be described. The roller body 42 is disposed such that the axis X2 thereof is inclined with respect to the axis X1 of the base 20. It is therefore required that the hole that receives the roller body 42 penetrate through the base 20 with an inclination from the axis X1 of the base 20 (see the two-dot chain line in FIG. 6A, for example). In order to prevent each drive roller 21 from rattling, a portion of each slot 46 around the roller shaft 41 of the drive roller 21 is defined by a pair of opposed surfaces orthogonal to the roller shaft 41 and opposed to each other. In order to form such a recess, through hole, and opposed surfaces inclined with respect to the axis of the base 20, it is necessary to perform cutting work step by step while changing the position of the base 20.

On the other hand, in the present invention, each upper die protrusion 73 has the upper die second wall surface 73B forming one of the opposed surfaces, and the upper die first wall surface 73A parallel to the die-cutting direction. Further, the angle between the upper die first wall surface 73A and the upper die second wall surface 73B is an acute angle, which allows the upper die 70 to be easily pulled out upward after the drive disk 4 is shaped. Each lower die protrusion 76 has the lower die first wall surface 76A forming the other of the opposed surfaces, and the lower die second wall surface 76B parallel to the die-cutting direction. The angle between the lower die first wall surface 76A and the lower die second wall surface 76B is an acute angle, which allows the lower die 71 to be easily pulled out downward after the drive disk 4 is shaped. Pulling out the upper die 70 and the lower die 71 in the die-cutting direction after the drive disk 4 is shaped allows the slots 46 inclined with respect to the rotational axis to be formed. This allows the base 20 to be formed with the dies, and it is therefore not necessary to form, by cutting work, the slots 46 one by one. This allows the base 20 to be easily manufactured and in turn can reduce the machining time and the manufacturing cost.

In the above embodiment, the upper die first wall surface 73A and the lower die second wall surface 76B are parallel to the die-cutting direction. Since the upper die first wall surface 73A and the lower die second wall surface 76B are arranged in alignment in the vertical direction, the upper die 70 and the lower die 71 can be easily positioned.

Combining the U-shaped recess 77 and the U-shaped protrusion 74 allows the upper die 70 and the lower die 71 to be positioned. Further, the bearing grooves 45 can be formed by the U-shaped protrusion 74. The bearing grooves 45 serve as a portion that receives the roller shaft 41, and the position of the drive roller 21 is determined by the position of the bearing grooves 45. It is therefore preferable that the positional accuracy of the bearing grooves 45 with respect to the slot 46 be higher. In the present embodiment, it is not necessary to separately form the bearing grooves 45 after forming the slot 46, and the positions of the slot 46 and the bearing grooves 45 are determined by the upper die 70, thereby making the positional accuracy of the bearing grooves 45 higher.

A connection portion (hereinafter, referred to as a first contact surface forming portion 91, see FIG. 8) between the U-shaped protrusion 74 and the upper die second wall surface 73B of the upper die protrusion 73 forms a connection portion (hereinafter, referred to as a first contact surface portion 92) between the bearing groove 45 and the slot 46 with which a connection portion between the cylindrical portion 48A and the flange portion 48B of the bushing 48 provided on one side of the roller shaft 41 comes into contact. Likewise, a contact portion (hereinafter, referred to as a second contact surface forming portion 93) between the U-shaped protrusion 74 and the lower die first wall surface 76A of the lower die protrusion 76 forms a connection portion (hereinafter, referred to as a second contact surface portion 94) between the bearing groove 45 and the slot 46 with which a connection portion between the cylindrical portion 48A and the flange portion 48B of the bushing 48 provided on the other side of the roller shaft 41 comes into contact. The first contact surface portion 92 can fix the bushing 48 to the base 20 with the same level of accuracy as the U-shaped protrusion 74, whereas the second contact surface portion 94 is shaped by the second contact surface forming portion 93, and the machining accuracy is thus determined based on the alignment accuracy between the upper die 70 and the lower die 71. This makes the second contact surface portion 94 lower in machining accuracy than the first contact surface portion 92.

Specific embodiments of the present invention have been described in the foregoing, but the present invention should not be limited by the foregoing embodiments and various modifications and alterations are possible within the scope of the present invention. In the above embodiment, an aspect where the base 20 is manufactured by forging has been described, but the present invention is not limited to this aspect. For example, the base 20 may be formed by casting or injection molding using the upper die 70 and the lower die 71 described above. In the above embodiment, the base 20 is made of metal, but is not limited to this aspect, and may be made of resin or the like.

In the above embodiment, the upper die 70 is provided with the positioning projection 86 and the secondary positioning recess 90, and the lower die 71 is provided with the positioning recess 88 and the secondary positioning projection 89, but the present invention is not limited to this aspect. The upper die 70 may be provided with the positioning projection 86 (or the secondary positioning recess 90), and the lower die 71 may be provided with the corresponding positioning recess 88 (or the corresponding secondary positioning projection 89).

In the above embodiment, the roller shaft 41 and the roller body 42 of the drive roller 21 are formed of separate members, but the present invention is not limited to this aspect. The roller shaft 41 and the roller body 42 may be formed of the same member.

Figure 10A:
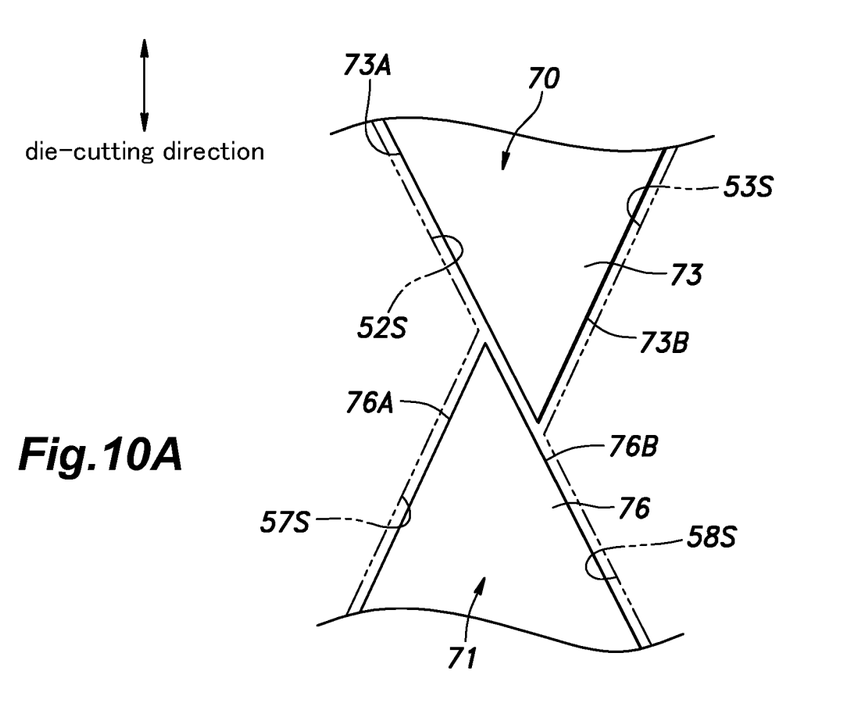
FIG. 10A is an explanatory view for explaining a state where an upper die and a lower die according to modifications are combined.

In the above embodiment, the upper die first wall surface 73A and the lower die second wall surface 76B are parallel to the die-cutting direction, but the present invention is not limited to this aspect. For example, as shown in FIG. 10A, the upper die first wall surface 73A and the lower die second wall surface 76B need not be parallel to the die-cutting direction. More specifically, an aspect may be employed where, when shaping of the drive disk 4 is completed, the upper die first wall surface 73A and the lower die second wall surface 76B are parallel to the inner parallel surface 52S and the outer parallel surface 58S, respectively, face away from each other, and are inclined with respect to the inner opposed surface 53S or the outer opposed surface 57S, and the upper die second wall surface 73B and the lower die first wall surface 76A are parallel to the inner opposed surface 53S and the outer opposed surface 57S, respectively, and face away from each other.

Figure 10B:
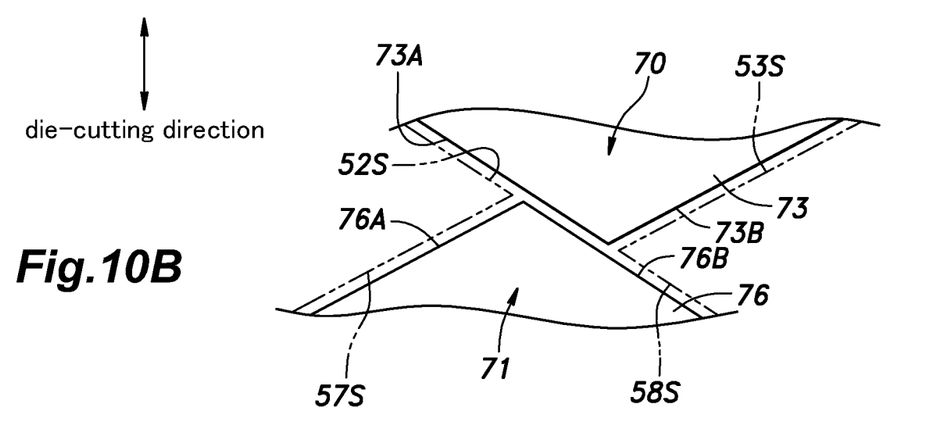
FIG. 10B is another explanatory view for explaining a state where an upper die and a lower die according to modifications are combined.

In the above embodiment and FIG. 10A, an aspect where the angle between the upper die first wall surface 73A and the upper die second wall surface 73B (the lower die first wall surface 76A and the lower die second wall surface 76B) is an acute angle as viewed in the extending direction has been given, but the present invention is not limited to this aspect. As shown in FIG. 10B, the angle between the upper die first wall surface 73A and the upper die second wall surface 73B (the lower die first wall surface 76A and the lower die second wall surface 76B) may be an obtuse angle as viewed in the extending direction.

The invention claimed is:

1. A manufacturing apparatus for a drive disk, the drive disk comprising:
    a plurality of drive rollers each including a supporting shaft protruding from both sides thereof; and
    a disk body having a plurality of slots arranged in a circumferential direction around a prescribed central axis and configured to receive the drive rollers,
    wherein each slot is partially defined by a pair of opposed surfaces opposed to each other at a space radially outside the supporting shaft of each drive roller and arranged orthogonally to the supporting shaft, and
    the opposed surfaces are inclined to the central axis,
the manufacturing apparatus comprising:
    an upper member and a lower member configured to be combined to form the disk body; and
    a drive unit configured to drive the upper member and the lower member in a moving direction along the central axis,
    wherein the upper member and the lower member each include a base and protrusions protruding from the base along the moving direction,
    each protrusion is defined by a plurality of surfaces including a first side surface inclined with respect to the opposed surfaces and a second side surface parallel to the opposed surfaces,
    the first side surface of the protrusion of the upper member and the first side surface of the protrusion of the lower member are parallel to each other and face away from each other,
    the second side surface of the protrusion of the upper member and the second side surface of the protrusion of the lower member face away from each other,
    the first side surface of the protrusion of the upper member and the first side surface of the protrusion of the lower member come into contact with each other to form the plurality of slots, and
    the upper member includes a U-shaped protrusion passing through a center in an extending direction of the protrusion, extending in a direction orthogonal to the extending direction of the protrusion, and having an end surface formed into a shape corresponding to the supporting shaft.

2. The manufacturing apparatus for the drive disk according to claim 1, wherein an angle between the first side surface of the upper member and the second side surface thereof and an angle between the first side surface of the lower member and the second side surface thereof are acute angles.

3. The manufacturing apparatus for the drive disk according to claim 1, wherein the first side surface is parallel to the moving direction.

4. The manufacturing apparatus for the drive disk according to claim 1, wherein the protrusion of the lower member is provided with a U-shaped recess extending from a center thereof in the direction orthogonal to the extending direction of the protrusion and formed into a shape corresponding to the U-shaped protrusion.

5. The manufacturing apparatus for the drive disk according to claim 1, wherein an end of the protrusion of the upper member and an end of the protrusion of the lower member are each provided with a step portion, and the step portion of the protrusion of the upper member and the step portion of the protrusion of the lower member engage with each other in a cross-sectional view.

6. The manufacturing apparatus for the drive disk according to claim 5, wherein an end surface of one of the protrusion of the upper member and the protrusion of the lower member is provided with a positioning projection protruding in the moving direction as viewed in the direction orthogonal to the extending direction of the protrusion, and the step portion of another of the protrusion of the upper member and the protrusion of the lower member is provided with a positioning recess recessed in the moving direction as viewed in the direction orthogonal to the extending direction of the protrusion and configured to receive the positioning projection.

* * * * *